(12) United States Patent
Kempen et al.

(10) Patent No.: US 6,428,710 B1
(45) Date of Patent: Aug. 6, 2002

(54) PROCESS AND PLANT FOR THE PREPARATION AND DELIVERY OF OZONATED WATER TO A USER POINT

(75) Inventors: Carinne Kempen, Clichy; Stéphane Laroye, Villiers le Bacle, both of (FR)

(73) Assignee: L'Air Liquide Societe Anonyme a Directoire et Conseil de Surveillance pour L'etude et L'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/680,979

(22) Filed: Oct. 6, 2000

(30) Foreign Application Priority Data

Oct. 20, 1999 (FR) ............................................. 99 13095

(51) Int. Cl.$^7$ ................................................ C02F 1/78
(52) U.S. Cl. ...................... 210/744; 210/760; 210/765; 210/97; 210/192; 210/194; 210/205
(58) Field of Search ................................ 210/744, 760, 210/765, 97, 192, 194, 198.1, 205

(56) References Cited

U.S. PATENT DOCUMENTS

| | | | |
|---|---|---|---|
| 5,451,314 A | | 9/1995 | Neuenschwander |
| 5,824,243 A | * | 10/1998 | Contreras |
| 5,868,945 A | | 2/1999 | Morrow et al. |
| 6,106,731 A | | 8/2000 | Hayes |
| 6,132,629 A | * | 10/2000 | Boley |

FOREIGN PATENT DOCUMENTS

WO          91/12209          8/1991

OTHER PUBLICATIONS

European Search Report issued in Application No. 00 40 2508.

* cited by examiner

*Primary Examiner*—Betsey Morrison Hoey
(74) *Attorney, Agent, or Firm*—Burns, Doane, Swecker & Mathis, L.L.P.

(57) ABSTRACT

The invention relates to a process for the preparation and delivery of ozonated water to at least one user point, according to which a storage buffer tank is provided for the ozonated water, and an upstream ozonation loop is provided, making it possible to feed the tank with ozonated water, the upstream ozonation loop comprising a component for controling the flow of water flowing in the loop. A fresh-water supply line is also provided, connected by its downstream part to the upstream ozonation loop and fitted with a component for interrupting the freshwater flow, the loop portion located between the tank and the connection point of the fresh-water supply line being fitted with a component for interrupting the recirculation flow upstream of the tank.

According to the invention, the tank fill level is controlled between a low level $N_1$ and a high level $N_h$ using said component for controling the flow of water flowing in the ozonation loop, one or other of said component for interrupting the fresh-water input and said component for interrupting the recirculation flow upstream of the tank being always open while the other of said components is closed.

17 Claims, 2 Drawing Sheets

PROCESS AND PLANT FOR THE PREPARATION AND DELIVERY OF OZONATED WATER TO A USER POINT

BACKGROUND OF THE INVENTION (I) Field of the Invention

The present invention relates to the field of processes for the preparation and delivery of ozonated water to at least one user point. The ozonated water may, as is known, be used in a large number of industrial applications: for example in connection with the environment (water treatment, etc.), for treating food products with ozone (washing food products such as seafood but also fruits and vegetables, etc. with ozonated water), or else in aquiculture and pisciculture (farms where ozone treatment of all or part of the water which supplies the spawning pool or pools of the user site is carried out.

(II) Description of the Related Art

Essentially, two types of processes for the preparation and delivery of ozonated water are known: a first type of process in which the in-line ozonation of the whole flow of water is carried out, and a second type of process in which ozonation of only a part of the flow of water is carried out in a bypass loop.

In both cases, it should be clearly noted that the key objective of this related art is to achieve a sufficient contact time between the ozone and the water, in order to obtain satisfactory disinfection of the water and proper management of the residual ozone and secondary oxidants content in the water thus treated.

The following comments can therefore be made regarding these two types of existing processes:

first, "in-line" type of process: In this case, the ozone is injected into a dissolution component such as a static mixer, which is placed in line on the pipe for the water to be treated for the user site. The necessary contact time (for disinfection) is then obtained either in an intermediate storage tank, or else quite simply over the length of pipe for the user site if its length is sufficient.

The required treatment rate (number of grams of ozone per $m^3$ of water) is then controlled using the flow rate of water which is drawn downstream by the user site. Moreover, the ozonated-gas flow rate is generally fixed (a variable gas flow rate being very expensive to achieve).

second, "ozonation in a bypass" type of process: In this second case, a fixed part of the flow of water of the user site is diverted in order to be ozonated.

A pump takes off a fixed flow of water, into which the ozone is injected by a dissolution component typically of the hydroinjector (venturi effect) type which is placed in the bypass. In this configuration it would be equally possible to use a static mixer but the hydroinjector is a less expensive item of equipment.

It is known that the hydroinjector only withstands very small variations in flow (the flow diverted is fixed for this reason). This is because if the water flowing through the hydroinjector varied substantially, this would lead to a variation in the flow of sprayed ozonate gas and therefore to a variation in the dissolved ozone content and therefore in the rate of treatment obtained.

As in the previous case, the required treatment rate (number of grams of ozone per $m^3$ of water) can only be controlled on the basis of the flow of water drawn downstream by the user site, which does not provide any independence with regard to the parameters of the downstream user site.

These existing processes are therefore directly dependent on the parameters of the final application of the ozonated water, and are therefore difficult to adapt to applications which require large variations in treatment rate (depending, for example, on the products treated), in the flow of water, or else to incessant start/stop cycles which depend on the production pauses and shutdowns of the final application of the ozonated water.

SUMMARY AND OBJECTS OF THE INVENTION

One of the objectives of the present invention is therefore to provide a solution to the above-mentioned technical problems, by proposing a process which is capable of being adapted to requirements (rate, flow, etc.) of the final user application, while being controlled independently of the parameters of this final application.

The present invention therefore relates to a process for the preparation and delivery of ozonated water to at least one user point, according to which:

a) a storage buffer tank is provided for the ozonated water;

b) an upstream ozonation loop is provided, making it possible to supply the tank with ozonated water, for which:

the tank is integrated into the loop;

the upstream ozonation loop comprises a gas/liquid transfer component and a component for controlling the flow of water flowing in the loop;

an ozonated gas supply line is provided, linked by its downstream part to the transfer component and by its upstream part to an ozonator;

a fresh-water supply line is provided, connected by its downstream part to the upstream ozonation loop and fitted with a component for interrupting the fresh-water flow;

the loop portion located between the tank and the connection point of the fresh-water supply line is fitted with a component for interrupting the recirculation flow upstream of the tank;

c) a line is provided for feeding the at least one user point with ozonated water from the tank;

d) the tank fill level is controlled between a low level $N_l$ and a high level $N_h$ using the component for controlling the flow of water flowing in the ozonation loop, one or the other of the component for interrupting the fresh-water input and the component for interrupting the recirculation flow upstream of the tank being always open while the other of the components is closed.

The process according to the invention may also adopt one or several of the following characteristics:

during phases of ozonated-water consumption by at least one of the user stations, the component for interrupting the recirculation flow upstream of the tank is in the closed position, and the component for interrupting the fresh-water input is in the open position in order to allow fresh water to be admitted into the upstream ozonation loop, to be ozonated by the transfer component and to allow the tank to be fed with water ozonated in this way, the tank fill level being controlled, between the low level $N_l$ and the high level $N_h$ using the component for controlling the flow of water flowing in the ozonation loop, the basis of one of the following signals:

i) a measurement of the tank fill level, ii) a measurement of ozonated water consumption by the consuming user station or stations;

during shutdowns or pauses in ozonated-water consumption by the at least one user station, the flow of ozonated water originating from the tank is recirculated toward this tank, before the flow of water reaches the user station;

during shutdowns or pauses in ozonated-water consumption by the at least one user station, the following measures are taken: as soon as the tank fill level goes above the high level $N_h$, the component for interrupting the fresh-water input is put into the closed position in order to interrupt the inflow of fresh water, and the component for interrupting the recirculation flow upstream of the tank is put into the open position in order to allow the ozonated water in the tank to be recirculated in the upstream ozonation loop thus closed;

during such shutdowns or pauses in consumption, the ozonator output is reduced to a minimum, non-zero output.

The invention also relates to a plant for the preparation and delivery of ozonated water to at least one user point, which comprises:

a) a storage buffer tank for ozonated water;
b) an upstream ozonation loop making it possible to feed the tank with ozonated water, for which:
   the tank is integrated into the loop;
   the upstream ozonation loop comprises a gas/liquid transfer component and a component for controlling the flow of water flowing in the loop;
   an ozonated-gas supply line is provided, linked by its downstream part to the transfer component and by its upstream part to an ozonator;
   a fresh-water supply line is provided, connected by its downstream part to the upstream ozonation loop and fitted with a component for interrupting the flow of fresh water;
   the portion of loop located between the tank and the connection point of the fresh-water supply line is fitted with a component for interrupting the recirculation flow upstream of the tank;
c) a line for feeding the at least one user point with ozonated water, from the tank;

one or other of the component for interrupting the fresh-water input and the component for interrupting the recirculation flow upstream of the tank being always in the open position while the other of the component is then in the closed position.

According to one of the embodiments of the invention, the feed line of the user station or stations is fitted with a pumping component and with a tap, capable of turning the flow of ozonated water originating from the tank back toward this tank, before the flow of water reaches the user station.

According to one of the aspects of the invention, the plant comprises a data acquisition and processing unit, capable, during phases of ozonated-water consumption by at least one of the user stations:

of placing the component for interrupting the recirculation flow upstream of the tank, into the closed position, and of placing the component for interrupting the fresh-water input into the open position;

of acquiring one of the follwoing signals: a measurement of the tank fill level or a measurement of ozonated-water consumption by the consuming user station ro station;

of controlling, on the basis of one of the above two signals, the tank fill level between a low level $N_l$ and a high level $N_h$.

The data acquisition and processing unit is advantageously capable, during shutdowns or pauses in ozonated-water consumption by the user station or stations, of putting the component for interrupting the fresh-water input into the closed position in order to interrupt the inflow of fresh water, and of putting the component for interrupting the recirculation flow upstream of the tank into the open position in order to allow the ozonated water in the tank to be recirculated in the upstream ozonation loop thus closed.

The data acquisition and processing unit is also advantageously capable, during such shutdowns or pauses in consumption, of reducing the ozonator output to a minimum output which is nonzero.

Other characteristics and advantages of the invention will emerge from the following description, given solely by way of illustration and in no way implying any limitation, and made with reference to the appended drawings.

DETAILED DESCRIPTION OF PREFERRED EMBODIMENTS

Figure 1:
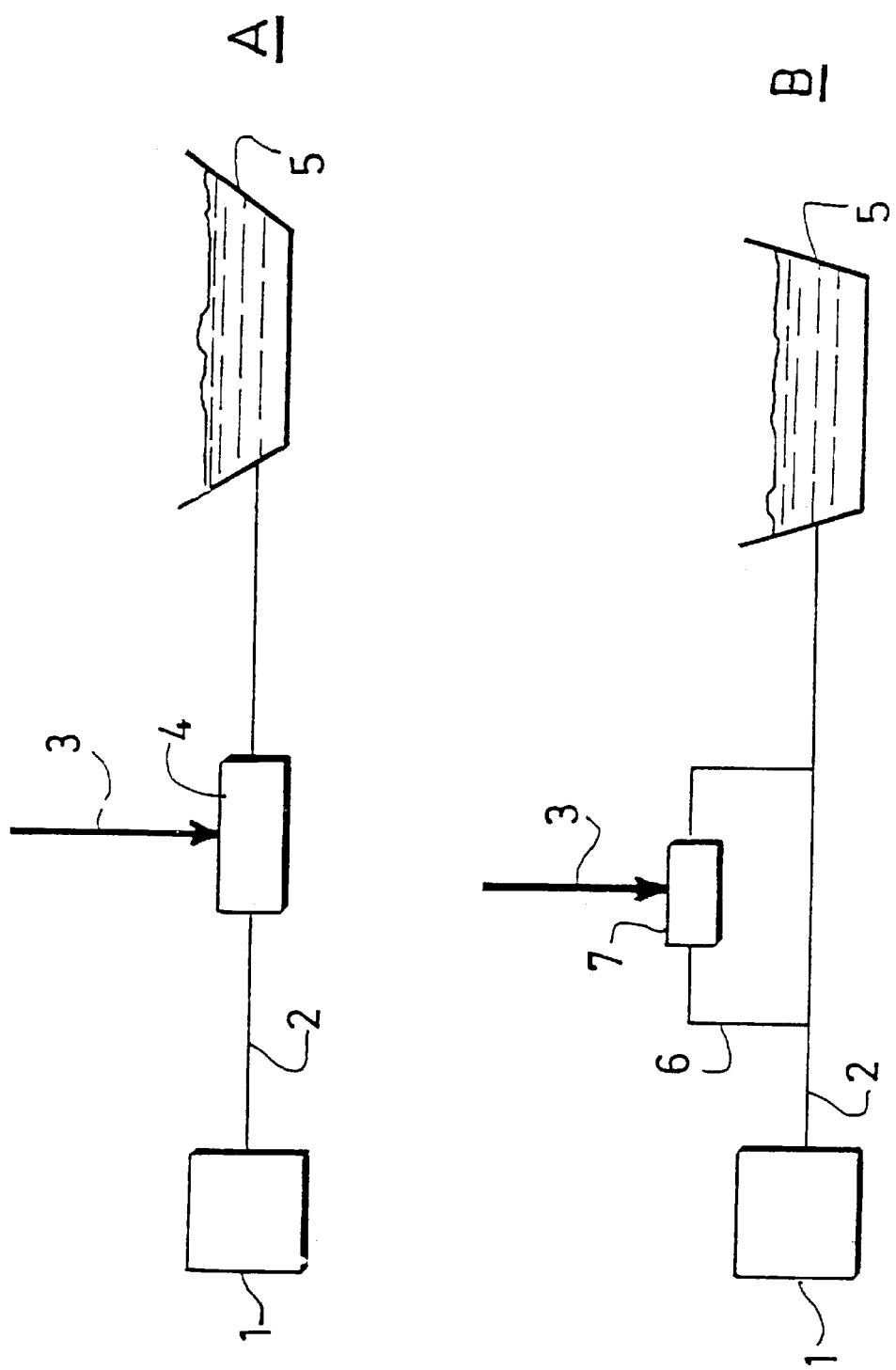
FIG. 1 (A and B) is a schematic representation of two ozonated water production plants according to the prior art (in-line and bypass)

FIG. 1A illustrates the case of "in-line" ozonation of a flow of water originating from a source 1, in order to feed a final user station 5 (for example a spawning pond in pisciculture) with ozonated water.

The presence of an ozonated-gas inflow line 3 (originating from an ozonator which is not shown), which must be injected into a dissolution component 4 (here, a static mixer), which is placed in line on the pipe 2 for water to be treated for the user site, is noted. The contact time needed for the disinfection is obtained here over the length of pipe existing between the static mixer and the final washing tank.

As the flow rate of ozonated gas is moreover fixed, in order to control the required ozone treatment rate (number of grams of ozone per $m^3$ of water), one is constrained here to take into account the variations in flow of water drawn downstream by the user site 5, in order to consequently control the ozonator output.

It is precisely such variations in flow of water which lead to a transfer component of the static-mixer type, which can accommodate such variations, preferably being adopted here.

It is now known (as already explained above) that such a configuration is not suited to the needs which form the basis of the present invention, since this type of process according to FIG. 1A would lead to a variation in ozonated output, varying on demand between 1 and 100% in order to adapt to the flow of water to be produced, the need to oversize the ozonator in order to respond to large and sudden demands for ozone, without however being able to efficiently follow the incessant start/stop cycles of the site.

We will now consider the case in FIG. 1B, which illustrates the case of an ozonation process in a bypass of the main flow of water: a pump takes off a fixed flow of water from the bypass line, in which flow the ozone is injected by a dissolution component 7 of the hydroinjector type (i.e. operating by the venturi effect) which is placed in the bypass 6.

It is known that a hydroinjector only withstands very small variations in flow (the flow diverted is fixed for this reason): this is because if the water flowing through the hydroinjector varied substantially, this would lead to a variation in the flow of the sprayed ozonated gas and therefore to a variation in the dissolved ozone content, leading to variation in the treatment rate obtained.

As in the previous case, the desired treatment rate (number of grams of ozone per $m^3$ of water) has to be controlled on the basis of the flow of water drawn downstream by the user site, which does not provide any independence with regard to the parameters of the final user site.

As now described below, the embodiment in FIG. 2, which is in accordance with the present invention, provides many other advantages.

As will be seen, the invention can be adapted to all the demands and variations in demand of the user site for ozonated water, without being subject to the production variation constraints of this site, and by independently controlling this final site.

Figure 2:
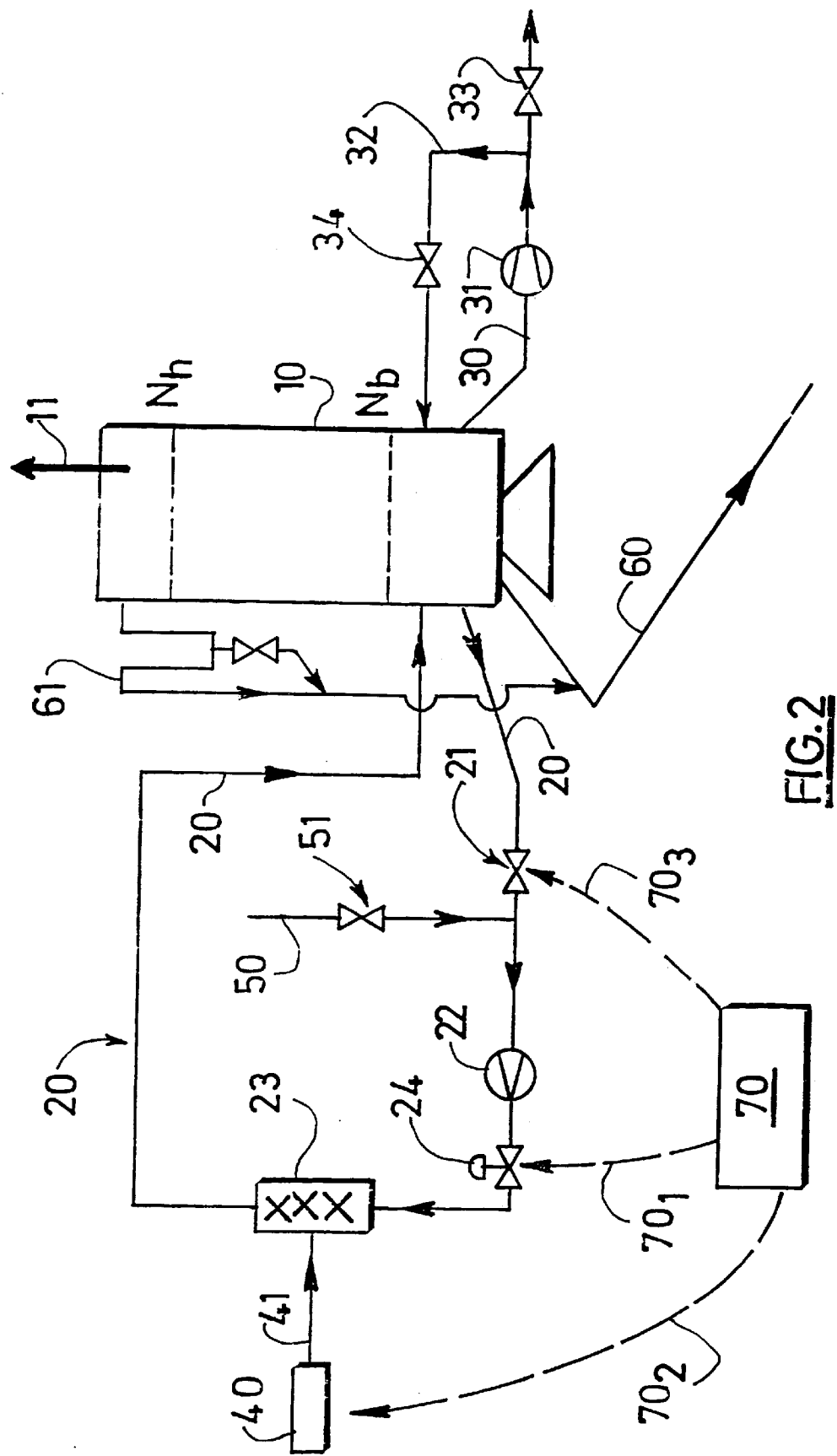
FIG. 2 is a schematic representation of a plant for the preparation and delivery of ozonated water in accordance with the present invention.

FIG. 2 shows the following elements:

the presence of a storage buffer tank 10 for the ozonated water;

the presence of an upstream ozonation loop 20 which makes it possible to feed the tank with ozonated water, for which:

i) as is seen, the tank is integrated into the loop;

ii) the upstream ozonation loop comprises a gas/liquid transfer component 23 (here a static mixer) and a component 24 for controlling the flow of water flowing in the loop;

iii) an ozonated-gas supply line 41, linked by its downstream part to the transfer components 23 and by its upstream parts to an ozonator 40, makes it possible to feed the transfer components 23 with ozone in order to ozonate the flow of water in the loop;

iv) a fresh-water supply line 50 is provided, connected by its downstream part to the upstream ozonation loop and is fitted with a component 51 for interrupting the flow of fresh water;

v) it is also noted that the loop portion 20 located between the tank and the connection point of the fresh-water supply line 50 is fitted with a component 21 for interrupting the recirculation flow upstream of the tank;

the presence of the line 30 for feeding the final user point or points (not shown) with ozonated water, from the tank, through a pump 31;

in addition it is seen that the plant in FIG. 2 here is fitted advantageously, at the feed line 30, with a pumping component 31 and with a tap 32, which arrangement is capable of turning (via the valve opening mechanism 33/34) the flow of ozonated water originating from the tank back toward this same tank, before the flow of water reaches the user station (in the case of shutdowns or pauses in consumption);

the presence of a data acquisition and processing unit 70, capable of receiving data (flow, ozone content, tank fill level, etc.) from the plant and of retroacting (arrows $70_1$, $70_2$, etc.) depending on each case on the valve 51, on the valve 21, on the control valve 24, or else on the ozonator output 40.

In addition, the plant is fitted with safety components (which may or may not be shown in the figure but which are known moreover to those skilled in the art of ozone) such as an overflow 61 fitted with a water-filled bend to allow the safe discharge of the ozonated water from the tank should the level be too high, bend fitted with a collected valve for draining into a closed overhead discharge 60, with means 11 for recovery and retreatment or storage of the gas overhead of the tank, or alternatively fitted with components such as ambient ozone detector, component for detecting the passage of water so that it is possible to stop the production of ozone should there be a shortage of water, revolving warning light, buzzer or other warning system should a fault be noted, or else, always by way of illustration, a remote control system allowing traceability of the system parameters, acquisition of logs, remote diagnostics, remote fault clearance, etc.

It can be now better understood, in the light of the entire above description, that such a plant according to the invention actually allows great adaptability and operation independent of the final use of the ozonated water.

According to the invention, with the exception of incidents or for reasons of safety justifying a lasting shutdown, in normal operation of the user site, water is continually ozonated and a certain amount of water is always left to flow in the upstream loop, even during the shutdown or production-pause phases of the downstream user site.

One or other of the components 51 and 21 (for interrupting the freshwater input and for interrupting the recirculation flow upstream of the tank) is always open while the other of the two components is closed.

Thus, in order for the characteristics of such a plant to be more clearly visualized, let us consider the case where the final site is in the process of consuming ozonated water:

the final site receives this ozonated water from the tank via the line 30 (without recirculation 32 here);

fresh water is regularly admitted into the circuit by the valve 51 and the pump 22, the water is ozonated (23) and thus feeds the tank, the valve 21 here being in the closed position;

the level in the tank is dynamically controlled between $N_1 < N < N_h$ using the control valve 24;

if a sudden change in consumption leads to N going about $N_h$, the data acquisition processing unit 70 then orders the closure of the fresh-water supply valve 51 and the opening of the valve 21 in order to recirculate the contents of the tank while waiting for the consumption conditions to change and for the level to go back below $N_h$, (then below $N_b$ to lead to the reopening of the valve 51, the closure of the valve 21, etc.).

Again, to better visualize the characteristics of such a plant, let us consider the case where the final site passes into the ozonated water shutdown or consumption-pause phase:

initially the system continues as previously (inflow of fresh water, ozonation, feeding of the tank, etc.), the level will therefore increase and go beyond the limit $N_h$;

the data acquisition and processing unit 70 then orders the closure of the fresh-water supply valve 51 and the opening of the valve 21 to recirculate the contents of the tank; it also preferentially places the valve 24 in low, fixed opening (optimized);

also preferentially, the unit sets up the downstream recirculation of the ozonated water coming from the tank (30/32/34);

it also advantageously places the ozonator so as to operate in a minimum, nonzero output regime.

A plant such as that which has just been described has been used successfully for supplying ozonated water to several user stations carrying out salad washing, under the conditions summarized below:

the average consumption by each station was 3 m³/h of ozonated water;

the treatment rate applied applied to fresh water was, depending on the products, from 10 to 20 ppm;

the tank fill level was controlled to 75% (of its total filling volume), while the thresholds $N_1$ and $N_h$ were set respectively at 65% and 85% (again, of the total filling volume).

What is claimed is:

1. Process for the preparation and delivery of ozonated water to at least one user point, comprising the steps of:
   a) providing a storage buffer tank for the ozonated water;
   b) providing an upstream ozonation loop, making it possible to supply the tank with ozonated water, for which:
   the tank is integrated into the loop;
   the upstream ozonation loop comprises a gas/liquid transfer component and a component for controlling the flow of water flowing in the loop;
   providing an ozonated-gas supply line, linked by its downstream part to the transfer component and by its upstream part to an ozonator;
   providing a fresh-water supply line, connected by its downstream part to the upstream ozonation loop and fitted with a component for interrupting the fresh-water flow;
   fitting the loop portion located between the tank and the connection point of the fresh-water supply line with a component for interrupting a recirculation flow upstream of the tank;
   c) providing a line for feeding said at least one user point with ozonated water from the tank;
   d) controlling the tank fill level between a low level $N_1$ and a high level $N_h$ using said component for controlling the flow of water flowing in the ozonation loop, one or other of said component for interrupting the fresh-water input and said component for interrupting the recirculation flow upstream of the tank being always open while the other of said components is closed.

2. The process according to claim 1, wherein during phases of ozonated-water consumption by at least one of said user points, said component for interrupting the recirculation flow upstream of the tank is in the closed position, and said component for interrupting the fresh-water input is in the open position in order to allow fresh water to be admitted into the upstream ozonation loop, to be ozonated by the transfer component to feed the tank with water ozonated in this way, the tank fill level being controlled, between the low level $N_1$ and high level $N_h$ using said component for controlling the flow of water flowing in the ozonation loop, on the basis of one of the following signals:
   a measurement (N) of the tank fill level;
   a measurement of ozonated water consumption by the consuming user point or points.

3. The process according to claim 1, further comprising the step, during shutdowns or pause in consumption of ozonated water by at least one user point, of recirculating the flow of ozonated water originating from the tank back to the tank, before said flow of ozonated water reaches the user point.

4. The process according to claim 1, further comprising the step of, during shutdowns or pauses in ozonated-water consumption by said at least one user point, taking one of the following measures:
   as soon as the tank fill level goes above the high level $N_h$, said component for interrupting the fresh-water input is put into the closed position in order to interrupt the inflow of fresh water, and
   said component for interrupting the recirculation flow upstream of the tank is put into the open position in order to allow the ozonated water in the tank to be recirculated in the upstream ozonation loop thus closed.

5. The process according to claim 3 or 4, comprising reducing the ozonator output to a minimum, nonzero output during shutdowns or pauses in consumption.

6. The process according to claim 1, further comprising the step of, during shutdowns or pauses in ozonated-water consumption by said at least one user station, taking one of the following measures:
   as soon as the tank fill level goes above the high level $N_h$, putting said flow control for controlling the flow of fresh-water into the loop into a closed position in order to interrupt the flow of fresh water into the feed point of the loop, and
   putting said flow control for controlling the flow of recirculating ozonated water between the storage buffer tank and the feed point into an open position in order to allow the ozonated water in the tank to be recirculated in the upstream ozonation loop thus closed.

7. A plant for the preparation and delivery of ozonated water to at least one user station, comprising:
   a) a storage buffer tank for ozonated water;
   b) an upstream ozonation loop making it possible to feed the tank with a flow of ozonated water, said loop comprising:
   the tank integrated into the loop;
   a gas/liquid contactor and a flow control which controls the flow of water flowing in the loop;
   an ozonated-gas supply line, linked by its downstream part to the contactor and by its upstream part to an ozonator;
   a fresh-water flow supply line, connected by its downstream part to a connection point of the upstream ozonation loop and fitted with a flow controller which interrupts the flow of fresh water;
   wherein the loop portion located between the tank and the connection point of the fresh-water supply is fitted with a flow control for interrupting the recirculation flow upstream of the tank;
   c) a line for feeding said at least one user station with ozonated water, from the tank;
   one or other of said flow controls for interrupting the fresh-water input and for interrupting the recirculation flow upstream of the tank being always in the open position while the other of said flow controls is then in the closed position.

8. The plant according to claim 7, wherein the feed line of said at least one user station comprises a feed pump and a tap capable of turning the flow of ozonated water originating from the tank back toward this tank, before the flow of water reaches the user station.

9. The plant according to claim 7 or 8, further comprising a data acquisition and processing unit capable, during phases of ozonated-water consumption by at least one of said user stations:
   of placing said flow control for interrupting the recirculation flow upstream of the tank into the closed position, and of placing said flow control for interrupting the fresh-water input into the open position;

of acquiring one of the following signals: a measurement of the tank fill level or a measurement of ozonated-water consumption by the consuming user station or stations;

of controlling, on the basis of one of the above two signals, the tank fill level between a low level $N_1$ and a high level $N_h$.

10. The plant according to claim 9, wherein said data acquisition and processing unit is capable, during shutdowns or pauses in ozonated-water consumption by said at least one user station, of putting said flow control for interrupting the fresh-water input into the closed position in order to interrupt the inflow of fresh water, and of putting said flow control for interrupting the recirculation flow upstream of the tank into the open position in order to allow the ozonated water in the tank to be recirculated in the upstream ozonated loop thus closed.

11. The plant according to claim 9, wherein said data acquisition and processing unit is capable, during such shutdowns or pauses in consumption, of reducing the ozonator output to a minimum, nonzero output.

12. The plant according to claim 8, wherein the upstream ozonation loop comprises an upstream pump and wherein this upstream pump and the feed pump have virtually identical flow specifications.

13. A process for the preparation and delivery of ozonated water to at least one user point, comprising the steps of:
(A) feeding a flow of fresh water into a feed point of an upstream ozonation loop, said upstream ozonation loop comprising the following operations;
  (i) ozonating the fresh water controllably fed into the loop by contacting a flow of said fresh water in said loop with ozone to produce a flow of ozonated water;
  (ii) feeding said ozonated water to a storage buffer tank which is integrated into said ozonation loop; and
  (iii) recirculating a flow of ozonated water between said storage buffer tank and the point where said flow of fresh water is fed into the loop;
(B) controlling the flow of water using separate flow controls for (a) the flow of fresh water into the feed point in the ozonation loop; (b) the flow of water between the feed point and the step (i) of ozonating the water; and (c) the flow of recirculating ozonated water between the storage buffer tank and the feed point;
(C) controlling a fill level of ozonated water in the storage buffer tank between a low level $N_1$ and a high level $N_h$ by using said flow controls, wherein one of said flow controls (a) for controlling the flow of fresh water into the feed point or (b) for interrupting the flow of ozonated water between the storage buffer tank and the feed point is always open while the other of said flow controls is closed; and
(D) feeding said at least one user station with ozonated water from said tank.

14. The process according to claim 13, wherein said step of ozonating the fresh water comprises feeding the fresh water into a gas/liquid transfer apparatus.

15. The process according to claim 14, wherein said step of ozonating comprises an ozonator attached via a gas supply line to the gas/liquid transfer apparatus.

16. The process according to claim 13, further comprising the steps of:

during phases of ozonated-water consumption by at least one of said user stations, maintaining said flow control for controlling the flow of fresh water into the feed point in an open position to allow fresh water to be admitted into the upstream ozonation loop for ozonating and feeding into said tank and maintaining said flow control for controlling the flow of ozonated water between the storage buffer tank and the feed point in the closed position;

controlling the tank fill level, between the low level $N_1$ and the high level $N_h$ using said control for controlling the flow of water between the feed point and the step (i) of ozonating the water, based on of one of the following signals:

a measurement (N) of the tank fill level;

a measurement of ozonated water consumption by the user station or stations.

17. The process according to claim 13, further comprising the step, during shutdowns or pause in consumption of ozonated water consumption by at least one user station, of recirculating the flow of ozonated water originating from the tank back to the tank, before said flow of ozonated water reaches the user station.

* * * * *